United States Patent [19]

Ferree et al.

[11] Patent Number: 4,941,577
[45] Date of Patent: Jul. 17, 1990

[54] PORTABLE ROBOTIC TOOL RACK

[75] Inventors: Herbert E. Ferree, Greensburg; Harry N. Andrews, Export; Frank W. Cooper, Jr.; Joseph R. Herberg, both of Monroeville Borough, all of Pa.

[73] Assignee: Space Industries Partnership, L.P., Webster, Tex.

[21] Appl. No.: 222,584

[22] Filed: Jul. 21, 1988

[51] Int. Cl.$^5$ .............................................. A47F 7/00
[52] U.S. Cl. ...................................... 211/70.6; 211/89
[58] Field of Search ...................... 211/70.6, 60.1, 87, 211/74, 13, 89, 71

[56] References Cited

U.S. PATENT DOCUMENTS

| | | | |
|---|---|---|---|
| 1,204,813 | 11/1916 | Murray | 211/60.1 X |
| 1,221,584 | 4/1917 | Patrick | 211/60.1 X |
| 2,815,863 | 12/1957 | Larson | 211/70.6 X |
| 3,269,550 | 8/1966 | Marcus | 211/70.6 X |
| 3,491,893 | 1/1970 | Morris | 211/60.1 |
| 3,568,849 | 3/1971 | Hutchison | 211/70.6 |
| 4,046,263 | 9/1977 | Cwycyshyn et al. . | |
| 4,098,088 | 7/1978 | Mason . | |
| 4,309,809 | 1/1982 | Yokoe et al. . | |
| 4,410,095 | 10/1983 | Dembicks | 211/70.6 |
| 4,487,316 | 12/1984 | Calhoun | 211/60.1 X |
| 4,510,684 | 4/1985 | Hutchins et al. . | |
| 4,575,802 | 3/1986 | Walsh . | |
| 4,604,787 | 8/1986 | Silvers, Jr. . | |
| 4,607,752 | 8/1986 | Sherrow | 211/70.6 X |
| 4,636,135 | 1/1987 | Bancon . | |
| 4,660,274 | 4/1987 | Goumas et al. . | |

OTHER PUBLICATIONS

Drawing by S. Walsh for Mechanotron TM Robotics, TITLE: Universal Robot Wrist W/Quic Change Tooling [n.a.], Robotic Tool-Exchange System, NASA Tech Briefs, May 1988, p. 74.

Primary Examiner—Alvin C. Chin-Shue
Assistant Examiner—Sarah A. Lechok
Attorney, Agent, or Firm—Venable, Baetjer and Howard

[57]    ABSTRACT

A rack for holding a plurality of tools includes a plate member having openings for receiving tools, detent pins for releasably securing the plate member to a surface, detent clips associated with each opening for releasably securing a tool within the associated opening and pin members associated with each opening for interacting with a tool using device to permit engagement and disengagement of the tool to the tool using device.

5 Claims, 2 Drawing Sheets

PORTABLE ROBOTIC TOOL RACK

CROSS-REFERENCE TO RELATED APPLICATIONS:

Related subject matter is disclosed and claimed in U.S. patent application Ser. No. 205,764, filed on June 13, 1988 and entitled "Modular, Reconfigurable Remotely Operable Service Arm", and in U.S. patent application Ser. No. 222,583, filed on July 21, 1988 and entitled "Ring Latched Coupler".

BACKGROUND OF THE INVENTION

1. Field of the Invention:

The present invention relates to tool racks and more particularly to a portable tool rack for use with a robotic system.

2. Description of the Prior Art:

Tool racks in general are quite well known. Typically, however, the rack and the tools are designed for manual use. When the tools and tool rack are designed for use in a robotic system, additional features not common to the known tool racks may sometimes be necessary.

A commercially available tool rack, manufactured by Mecanotron TM Robotics includes a support surface and legs. Openings in the support surface receive the tools, each of which has a precision ground tapered end to permit releasable engagement with a robot arm.

Bancon U.S. Pat. No. 4,636,135 which issued on Jan. 13, 1987, discloses a tool-holder for an industrial robot. The tool-holder is designed to carry a single tool specific to a particular function. Different tools are arranged in a tool rack or magazine The tool rack shown by the Bancon patent includes a support surface having openings therein for receiving tools The tools have ends which are designed to releasably mate with the robotic tool-holder.

Additional robot systems employing tool holders are disclosed in Mason U.S. Pat. No. 4,098,088; Cwycyshyn et al. U.S. Pat. No. 4,046,263; Walsh et al. U.S. Pat. No. 4,575,802; Silver, Jr. U.S. Pat. No. 4,604,787; Yokoe et al. U.S. Pat. No. 4,309,809; Hutchins et al. U.S. Pat. No. 4,510,684; and Goumas et al. U.S. Pat. No. 4,660,274.

SUMMARY OF THE INVENTION

The present invention provides a rack for holding a plurality of tools wherein each of the tools has means thereon for releasably engaging a tool using device. The rack includes a plate member having a plurality of openings therein, each opening being dimensioned to receive one tool, means, such as detent pins, for releasably securing the plate member to a surface, self-engaging means, such as detent clips, associated with each opening for releasably securing a tool, and means, such as at least one pin member, associated with each opening, for interacting with the tool using device to permit engagement and disengagement of the tool to the tool using device.

BRIEF DESCRIPTION OF THE DRAWINGS

The present invention will be better understood by reference to the drawings in which.

DETAILED DESCRIPTION OF THE PREFERRED EMBODIMENT

Figure 1:
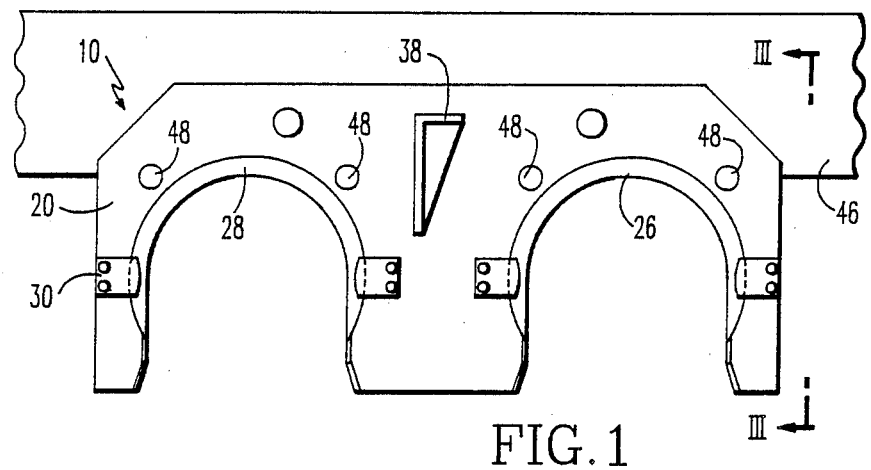
FIG. 1 is a plan view of a preferred embodiment of the tool rack of the present invention.
Figure 2:
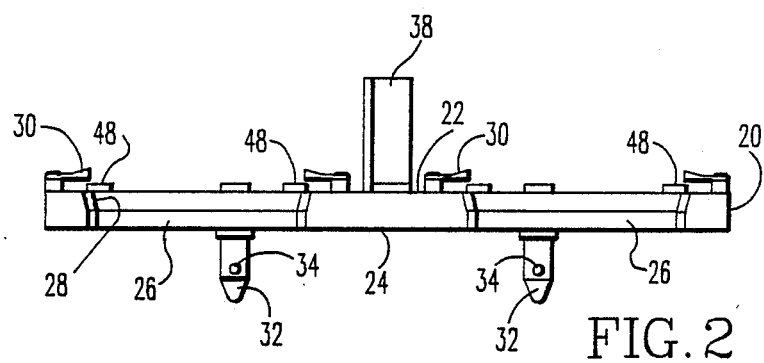
FIG. 2 is a front elevation view of the tool rack of FIG. 1.
Figure 3:
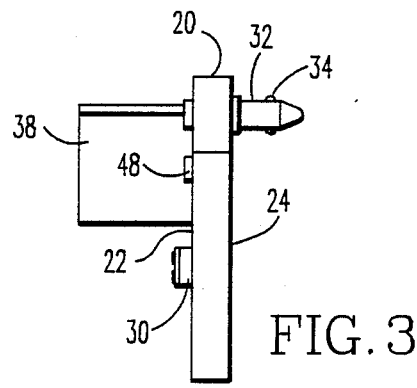
FIG. 3 is a side elevation view of the tool rack of FIG. 1.

A preferred embodiment of the tool rack 10 of the present invention is illustrated in FIGS. 1-3. Tool rack 10 may be used under almost any circumstances but is particularly well suited for use with a robotic arm and tool coupler system, such as disclosed in copending applications Ser. No. 205,764, filed on June 13, 1988 and entitled "Modular, Reconfigurable Remotely Operable Service Arm", and Ser. No. 222,583, filed on July 21, 1988 and entitled "Ring Latched Coupler ", both of said applications being incorporated herein by reference.

The tool rack 10 includes a plate member 20 having an upper surface 22 and a lower surface 24.

Referring to FIG. 1, the plate member 20 includes a plurality of openings 26 (two are shown) for receiving a tool. The openings 26 are shown as U-shaped cut outs. Those skilled in the art will appreciate, however, that the openings 26 may assume any shape suitable for receiving and releasably securing a desired tool.

Figure 4:
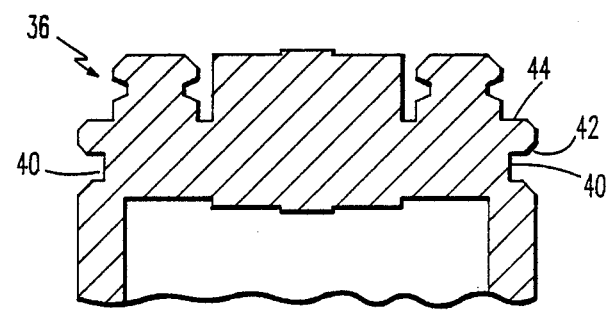
FIG. 4 is a view of a portion of a tool which may be received by the tool rack of FIG. 1.

Each opening 26 preferably has a beveled interior edge 28 for sliding contact with a complimentary surface on a tool, such as the beveled surfaces 42 at the exterior edges of groove 40 on tool 36, a portion of which is shown in FIG. 4. The tool 36 is slidably received in tool rack 10 by aligning groove 40 with an opening 26.

Associated with each opening 26 on the upper surface 22 of plate member 20, is a self-engaging means, preferably comprising one or more detent clips 30, for releasably securing the tool 36. The edge 44 of tool 36 slides under clip 30. There are preferably two clips 30, one on each side of opening 26.

Detent pins 32 extend from lower surface 24 of plate member 20 for releasably securing the tool rack 10 to a desired surface 46. Each detent pin 32 has spring loaded balls 34 which apply outward pressure against a suitable recess or bore (not shown) in a surface 46 to hold the tool rack 10 in place. Each detent pin 32 preferably has a holding force of 2–4 lbs., thus requiring a force of less than 10 lbs. for insertion or removal of tool rack 10 from a desired location When used as contemplated in microgravity, detent pins 32 should be adequate to assure that rack 10 will not drift loose, but any suitable tethers could be used to assure that rack 10 will not be lost.

Tool rack 10 also includes a handle or gripping member 38 which extends from upper surface 22 of plate member 20. Handle 38 provides a convenient means to grasp tool rack 10 to insert or remove it from one location to the next.

Figure 5:
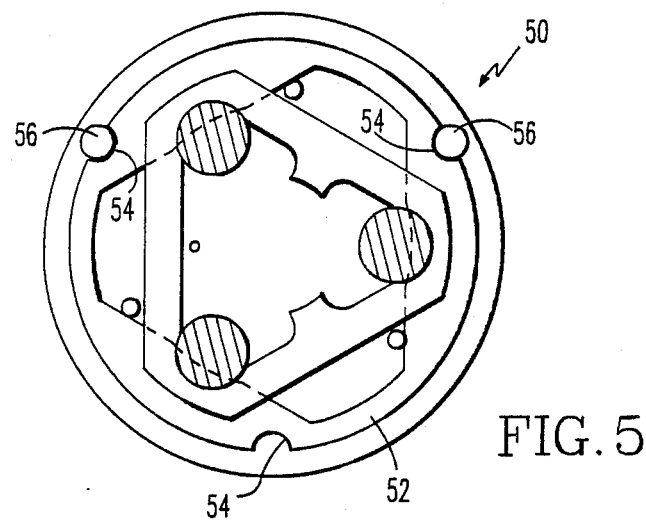
FIG. 5 is a plan view of a tool using device which may be used with the tool of FIG. 4 and the tool rack of FIG. 1.

Tools 36 are adapted for use by a tool using device 50, such as the robotic arm described in the copending application referenced and incorporated above. An end view of a suitable tool using device 50 is illustrated in FIG. 5. The tool using device includes means for engaging and disengaging the end of a tool 36. A ring-like member 52 has notches 54 into which buttons 56 are positioned. Pin members 48 on the upper surface 22 of tool rack 10 are associated with each opening 26. The pin members 48 are dimensioned and positioned to mate with the notches 54 in the ring-like member 52 on tool using device 50.

When tool using device 50 is employed to remove or replace a tool 36 from the tool rack 10, the tool using device 50 is aligned so that pin members 48 on tool rack 10 mate with notches 54 on ring-like member 52 of tool using device 50 and interact with buttons 56 on tool using device 50 to permit the engagement and disengagement of tool 36 with tool using device 50.

Tool using device 50 may be any suitable device or combination of complimentary structures designed for removing and replacing tools from tool rack 10. Although notches 54 and buttons 56 have been described, any suitable structure or surface on a tool using device which aligns and interacts with pin member 48 or any other suitable means on tool rack 10 for permitting the engagement and disengagement of a tool with the tool using device will suffice.

What is claimed is:

1. A rack for holding a plurality of tools, each of said tools having means thereon for releasably engaging a tool using device, said rack comprising:

a plate member having a plurality of openings therein, each of said openings being dimensioned to receive one of said tools;

means for releasably securing said plate member to a surface;

self-engaging means associated with each of said openings for releasably securing said tool; and means associated with each of said openings for interacting with said tool using device to permit engagement and disengagement of said tool to said tool using device.

2. The rack recited in claim 1 further comprising a handle extending from said plate member.

3. The rack recited in claim 1, wherein said means for securing said plate member to a surface comprise detent pins.

4. The rack recited in claim 1, wherein said self-engaging means for releasably securing said tool comprises at least one detent clip.

5. The rack recited in claim 1, wherein said means for interacting with said tool using device comprises at least one pin member positioned to interact with a complementary structure on said tool using device.

* * * * *